(12) United States Patent
Baig (10) Patent No.: US 10,586,261 B2
(45) Date of Patent: Mar. 10, 2020

(54) DIRECT DELIVERY SHOPPING SYSTEM

(71) Applicant: Minerva P. Baig, Roselle, IL (US)

(72) Inventor: Minerva P. Baig, Roselle, IL (US)

( * ) Notice: Subject to any disclaimer, the term of this patent is extended or adjusted under 35 U.S.C. 154(b) by 0 days.

(21) Appl. No.: 16/009,160

(22) Filed: Jun. 14, 2018

(65) Prior Publication Data

US 2018/0293542 A1    Oct. 11, 2018

Related U.S. Application Data (63) Continuation-in-part of application No. 14/256,001, filed on Apr. 18, 2014, now abandoned.

(51) Int. Cl.

| G06Q 30/00 | (2012.01) |
| G06Q 30/06 | (2012.01) |
| G06Q 10/08 | (2012.01) |
| B65G 49/00 | (2006.01) |
| B65G 43/00 | (2006.01) |

(52) U.S. Cl.
CPC ......... G06Q 30/0609 (2013.01); B65G 43/00 (2013.01); B65G 49/00 (2013.01); G06Q 10/087 (2013.01); G06Q 10/0832 (2013.01); G06Q 10/0836 (2013.01); G06Q 30/0635 (2013.01)

(58) Field of Classification Search
CPC ........... G06Q 30/0609; G06Q 30/0635; G06Q 10/0836; G06Q 10/0832; G06Q 10/087; B65G 43/00; B65G 49/00
See application file for complete search history.

(56) References Cited

U.S. PATENT DOCUMENTS

| 7,063,263 | B2 * | 6/2006 | Swartz | G06K 17/00 235/462.45 |
| 7,720,194 | B2 * | 5/2010 | Connelly | G01V 5/0016 378/57 |
| 8,396,758 | B2 * | 3/2013 | Paradise | G06Q 30/02 705/26.62 |
| 10,387,817 | B2 * | 8/2019 | Kellstrand | G06Q 10/0635 |
| 2004/0249497 | A1 * | 12/2004 | Saigh | E04H 14/00 700/216 |
| 2006/0206395 | A1 * | 9/2006 | Vallabh | G06Q 10/08 705/26.1 |
| 2010/0076796 | A1 * | 3/2010 | Klein | B64F 1/368 705/5 |

OTHER PUBLICATIONS

"Best Previews Its Look of the Future in New 'Diamond' Prototype", by Richard Halverson, Discount Store News 0:0, 1, (Oct. 7, 1991) (Year: 1991).*
"'Best Express' guarantees merchandise in 8 minutes," Discount Store News 25: p3(2), (Jul. 7, 1986) (Year: 1986).*

* cited by examiner

*Primary Examiner* — Anne M Georgalas
(74) *Attorney, Agent, or Firm* — Fraline J. Allgaier (57) ABSTRACT

A method for improving the delivery of items based on the likelihood of shoplifting, theft history, security threat level, and identifying information is presented. The information is stored an online order system that receives data, reads data, and performs computations from a data storage system. The online order system assigns a level of security to the items in order to implement delivery of the items at a specific conveyor belt within a store that is equipped with a pre-delivery alert system that cooperates with the online order system. The pre-delivery alert system produces a specific alert based on the contents of the customer's order.

8 Claims, 12 Drawing Sheets

| Customer Oder Items | ID# | Level of Security | | | | | | |
|---|---|---|---|---|---|---|---|---|
| | | 1 | 2 | 3 | 4 | 5 | 6 | 7 |
| Laptop (TL6) Oranges (TL1) Rifle (TL7) | 10000 5000 | | | | | | | 7 Belt 7 |
| Jewelry (TL7) 38  36 | 9000 | | | | | | | 7 Belt 7 |
| Phone Cable (TL6) 36 | 8000 | | | | | | 6 Belt 6 | |
| Steak (TL4) 36 | 7000 | | | | 4 Belt 4 | | | |
| Spices (TL2) Grapes TL1) | 6000 5000 | | 2 Belt 2 | | | | | |
| Apples (TL1) Oranges (TL1) Grapes (TL1) | 5000 5000 5000 | 1 Belt 1 | | | | | | |

FIG. 5

| Products | ID# | Stock Quantity | Unit Cost | Theft History | | | |
|---|---|---|---|---|---|---|---|
| | | | | 2017 | 2016 | 2015 | 2014 |
| Laptop (TL 7) | 10000 | 30 | $500.00 | 10 | 9 | 5 | 4 |
| Jewelry (TL7) | 9000 | 30 | $200.00 | 5 | 5 | 5 | 4 |
| Phone Cable (TL6) | 8000 | 50 | $30.00 | 20 | 17 | 16 | 4 |
| Steak (TL4) | 7000 | 50 | $20.00 | 30 | 25 | 30 | 40 |
| Spices (TL2) | 6000 | 100 | $5.00 | 3 | 3 | 2 | 3 |
| Apples (TL1) | 5000 | 200 | $0.75 | 35 | 35 | 30 | 40 |

DIRECT DELIVERY SHOPPING SYSTEM

RELATED APPLICATIONS

This application is a continuation-in-part of U.S. Utility patent application Ser. No. 14/256,001 filed Apr. 18, 2014, now abandoned.

BACKGROUND OF THE INVENTION

The present invention relates to a direct delivery shopping method that may be integrated into an existing store and more particularly to an improved shopping method for the delivery of purchased items using established technology to provide a level of security for items and establishing delivery at a specific conveyor belt. This method seeks to prevent shoplifting, produce a safer shopping environment, and to improve a customer's shopping experience.

Shoplifting has become a major problem for most retail stores. Shoplifters steal from a wide variety of stores including supermarkets, department stores and convenience stores. Besides the legal effects on the offender, shoplifting overburdens our legal system, causes the cost of goods to increase and increases the cost of a retail store's security system. This affects families and the quality of life in communities.

The safety of shoppers can also become a concern when dangerous items such as chemicals or weapons are purchased. Store employees might forget to warn a customer about the dangers of an item before a customer exits a store.

To this end, there have been a number of systems developed in order to prevent shoplifting or to prevent other customers from being harmed by items that have been sold. Current security measures include but are not limited to stick-on labels or shoplifting prevention tags that can be detected by sensors at store exits. Stick-on labels and tags can be found in various sizes and thickness and can be hidden inside items that have been offered for sale or wrapped on the exterior of the items. The devices can be disabled at the time of payment or by subjecting them to specific emission processes. However, such deactivation processes are not sufficiently reliable. Repeated bending or tearing can cause such devices to malfunction. In addition, customers can easily remove such devices in an attempt to shoplift.

Later improvements to devices to prevent shoplifting include wired tags that are wrapped around boxes or packages. These wired tags proved to be inefficient in that it took a substantial amount of time and cost to mount the devices on packages and the overall appeal of the products was diminished. In addition, the wires would loosen and the packages would ultimately loose protection.

The Food Marketing Institute has reported than in 2012, consumers made an average of 1.7 trips to the supermarket per week. This includes weekly stock-up trips and multiple fill-in trips. Consumers visited various store formats in order to purchase an assortment of products or to buy non-perishable items.

The retail items, limited assortment store, superstore, drugstore and supermarket industries have placed importance on finding convenient methods for customers to select items, eliminating congestion during shopping and reducing customer checkout times. Shopping systems are typically laid out in a manner that allows customers to walk from aisle to aisle while inspecting items. Often times, store aisles are congested with shopping baskets and customers. This often makes it difficult for customers to properly inspect items. In addition, customers might travel longer distances in order to find one item. After selecting items, customers often proceed to checkout areas that are narrow and congested with shopping baskets and additional customers.

Accordingly, it would be advantageous to provide a direct delivery shopping method which may be easily integrated into an existing store or shopping complex. This system would also work for small retailers who sell a limited amount of quality items and would like to prevent shoplifting, protect its customers, and protect the quality and integrity of those items.

The new method of delivering items uses an online order system to compute the likelihood of shoplifting based on the theft history of items, the assigned security level, and the product identification. The online system assigns a level of security to the items based on said likelihood of shoplifting of the items. The online order system uses the level of security to implement delivery of said items at a specific conveyor belt. A customer places an order for the item at a store kiosk and the online order system automatically assigns the conveyor belt based on the level of security assigned to the items.

BRIEF SUMMARY OF THE INVENTION

It is therefore an objective of the present invention to address the above concerns and to provide a direct delivery shopping method that prevents shoplifting, has an improved store layout, provides for expedited delivery of orders to customers and reduces waiting times to retrieve orders.

Another objective of the present invention is to provide a new method of delivering items by computing a likelihood of shoplifting of the items based on the theft history, the security level, and identification of the items.

Another objective of the present invention is to provide a new method of delivering items using an online order system to determine the security levels of the items based on likelihood of shoplifting the items.

Another objective of the present invention is to provide a new method of delivering items with an online order system using the conveyor belt layout of a store to delivery items based on the security level of the items.

Another objective of the present invention is to present an invention that provides a unitary alert system which can be properly oriented in a conveyor belt layout so as to alert shoppers about the items that have been purchased.

Additional advantages and features of the present invention will become more apparent when considered in light of the following specification and drawings.

DETAILED DESCRIPTION OF THE INVENTION

A new method of delivering items 38 using a standard release screen 22 is described herein. The method comprises the steps of using a pre-delivery alert system 20 and an online order system 10 with means for receiving data, reading data, and performing computations from a data storage system. The pre-delivery alert system 20 cooperates with the online order system 10 as each order is processed and any necessary lighting and warning system is produced.

Figure 1:
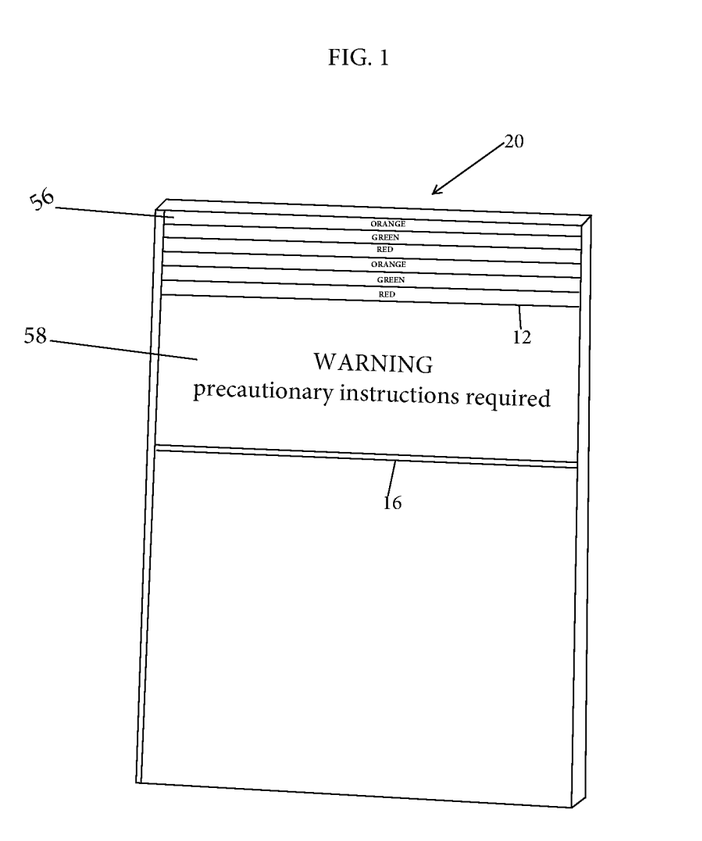
FIG. 1 shows the pre-delivery alert system of the present invention.

The pre-delivery alert system 20 is an alert box 16 with an interior channel 18 for storing a release screen 22. The alert box 16 allows store employees to double check the items 38 for any necessary warnings before the customer exits the store 26. The customer as well as other shoppers would be aware of the danger of the items 38 and immediately use necessary precautions when handling the items 38.

Figure 11:
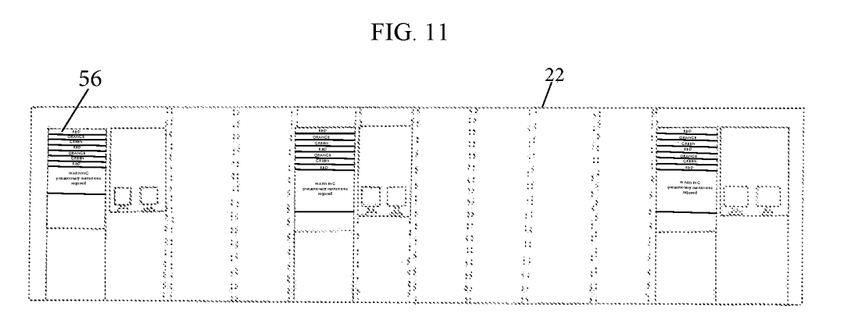
FIG. 11 is an exemplary conveyor belt layout of a store having a plurality of conveyor belts.
Figure 12:
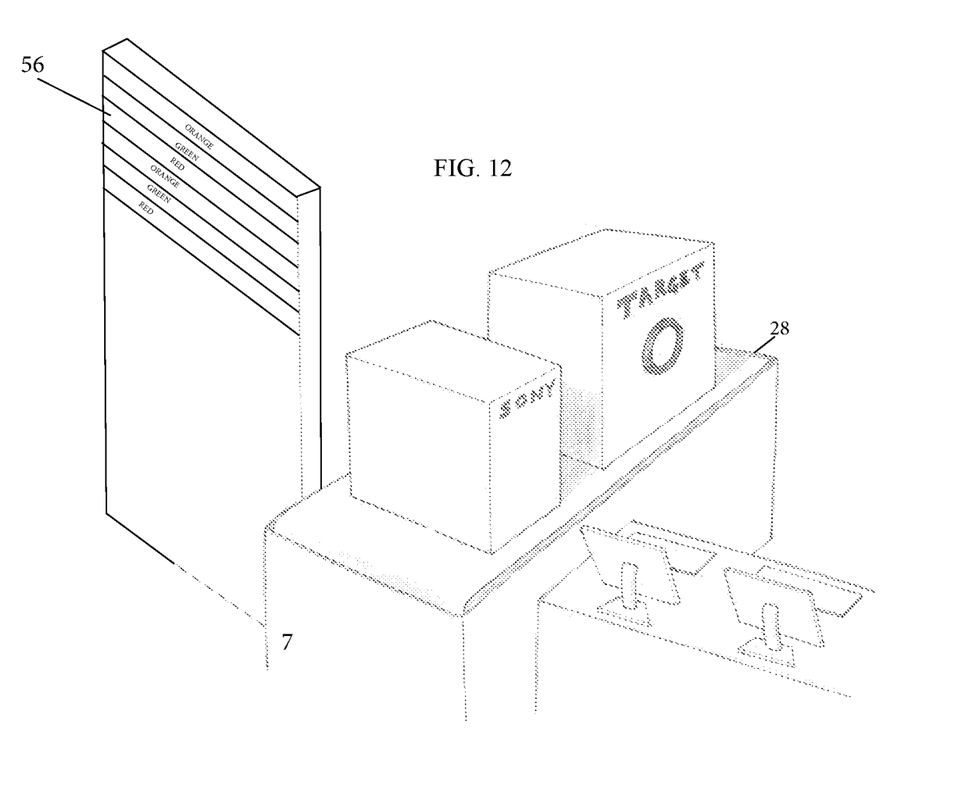
FIG. 12 is an exemplary customer order being prepared for delivery at a conveyor belt.

The online order system stores the conveyor belt layout 24 of a typical store 26 that would house a plurality of conveyor belts 28 and conveyor belt exit areas. The online order system 10 receives the theft history 34, identifying information 44, likelihood of shoplifting and security threat level 36 of the items 38 and computes the security alert level for the items 38.

Figure 9:
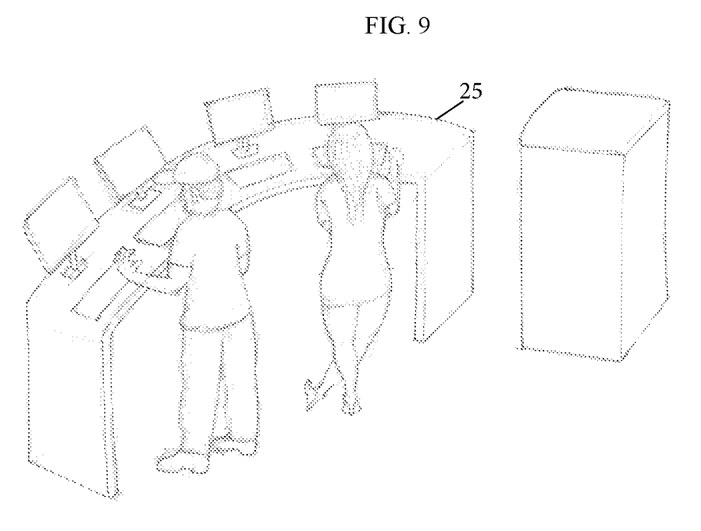
FIG. 9 shows customers accessing the online order system from kiosks located within a store.
Figure 10:
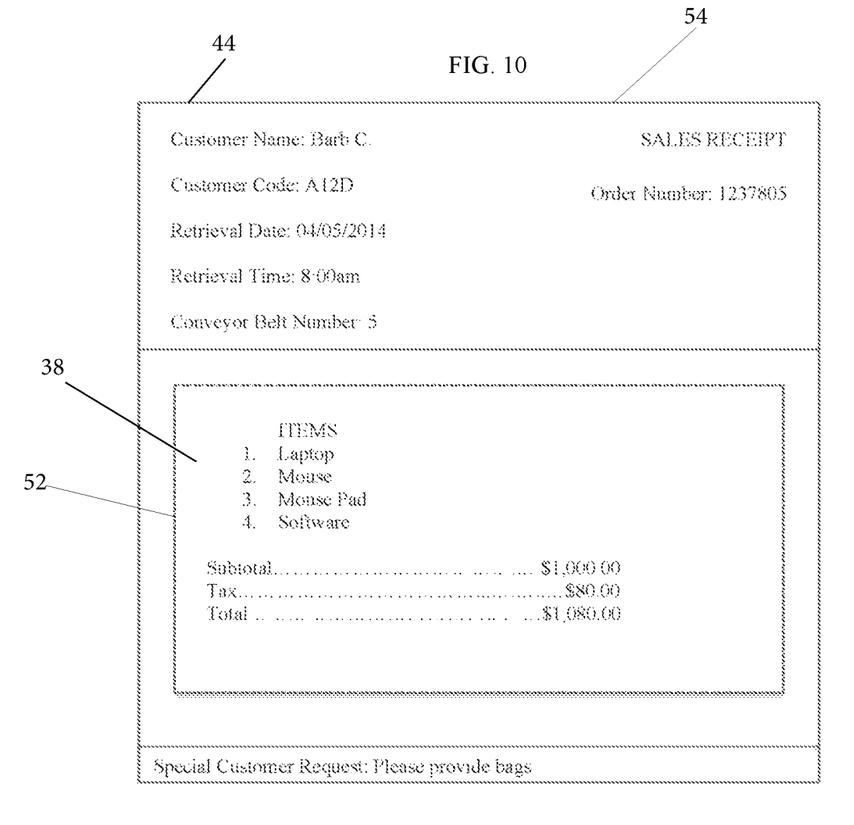
FIG. 10 is a representation of one embodiment of a customized sales receipt.

The online order system uses the security alert level to implement delivery of the items 38 at specific conveyor belts 28. A customer places a customer order 52 for at least one of the items 38 from the online order system 10 from any available kiosk 25 of the store 26. Once the online order system 10 accepts the customer order 52, the security alert level is assigned to the items 38 based on the likelihood of shoplifting, the security threat level 36, theft history 34, and identifying information 44 of the items 38. The conveyor belts 28 for retrieval of the items 38 are later assigned for each store 26. The online order system 10 displays the items 38 and the conveyor belts 28 on a receipt 54. Once the customer prints the receipt 54, the items 38 are available for retrieval at the specified conveyor belts 28.

Figure 4:
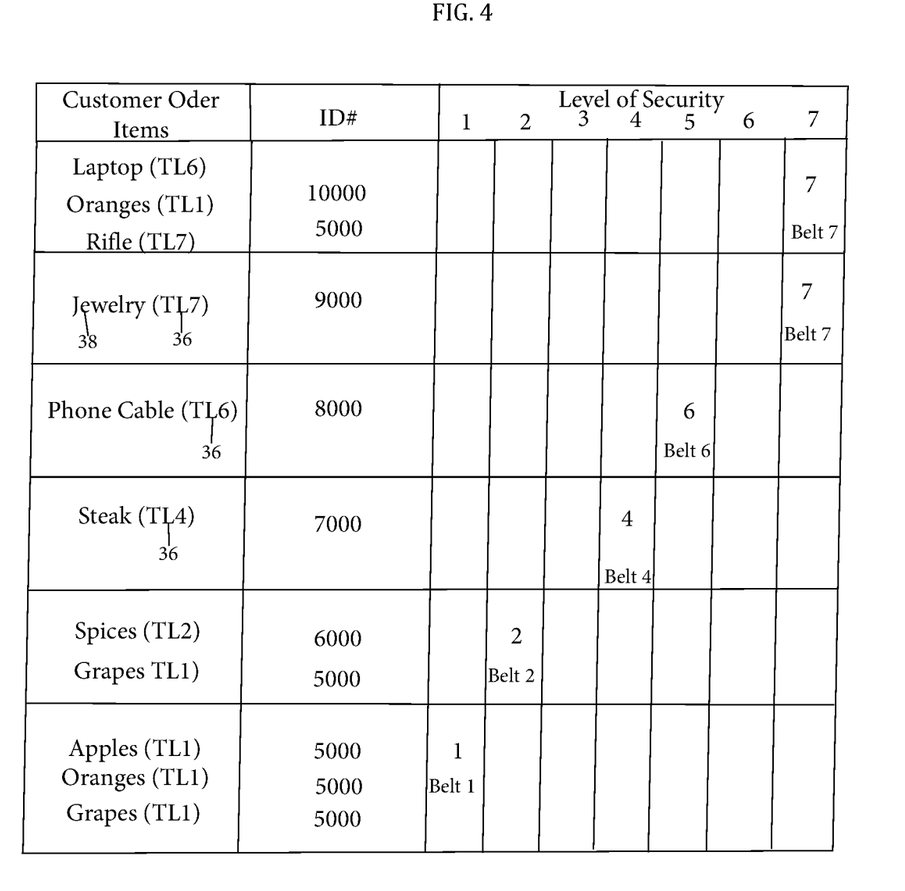
FIG. 4 is an exemplary chart showing the level of security and conveyor belts assigned to items based on the level of security.
Figure 5:
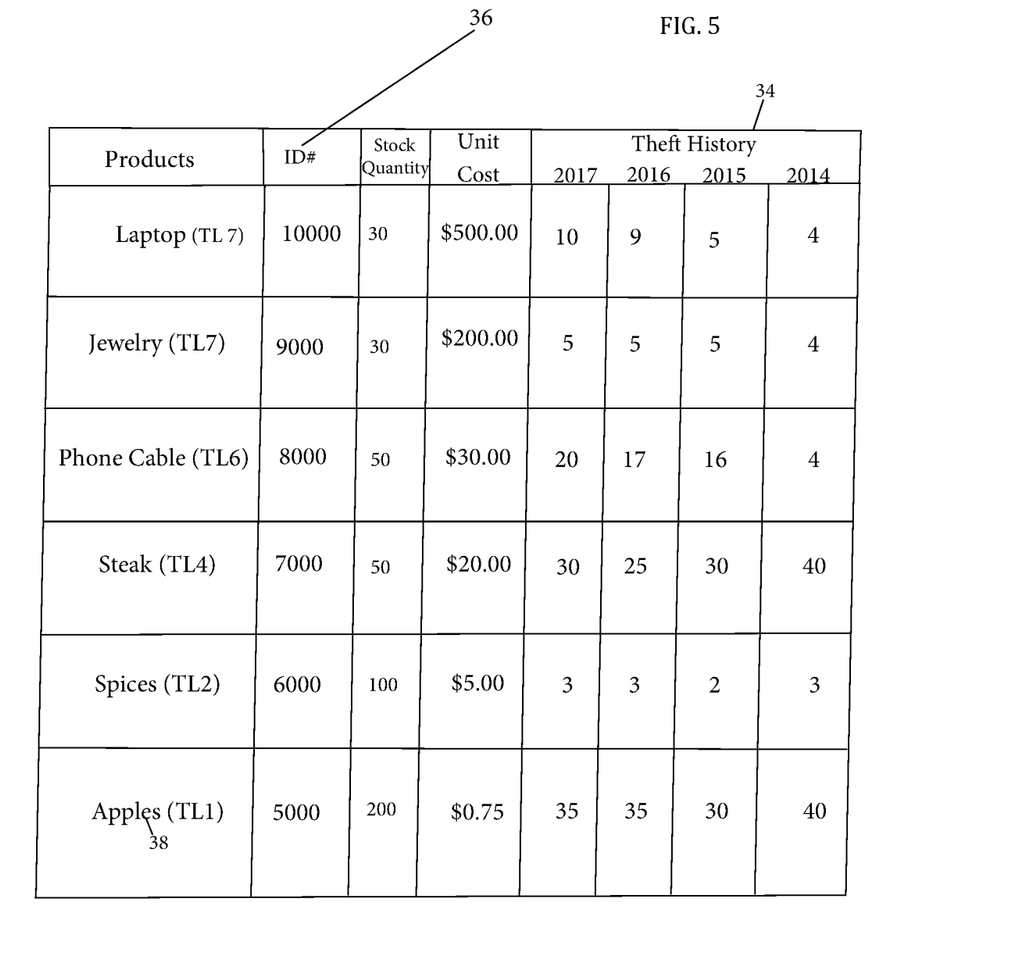
FIG. 5 is an exemplary chart showing the theft quantity of items from an initial stock and the identification number of the items.

FIG. 4 shows the pre-assigned threat levels for each item 38 that is used to assign a level of security. The level of security is chosen as the most important factor in the customer order 52 and the conveyor belt number is corresponding to the threat level 36 of each item 38. Further describing FIG. 4 wherein the level of security is assigned based on the maximum threat level in a customer order 52. For example, if a customer order 52 has a rifle of threat level 7, an apple of threat level 1, an orange of threat level 1, and a laptop of threat level 6, it is the maximum threat level of those three items that determines the level of security. FIG. 4 further shows that those items have been assigned to conveyor belt number 7. Each of the plurality of conveyor belts has a different level of security and associated security procedures.

Figure 2:
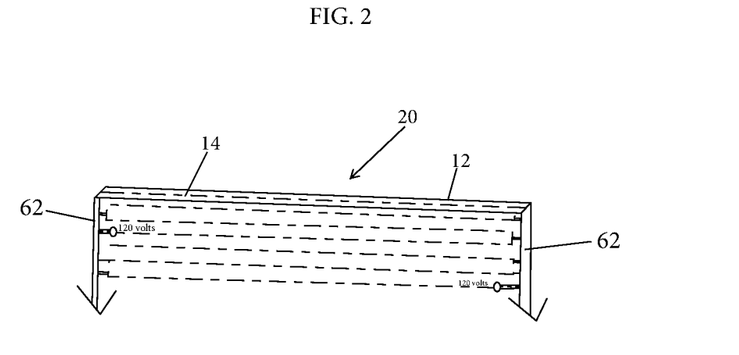
FIG. 2 shows the lighting color arrangement of the pre-delivery alert system.
Figure 3:
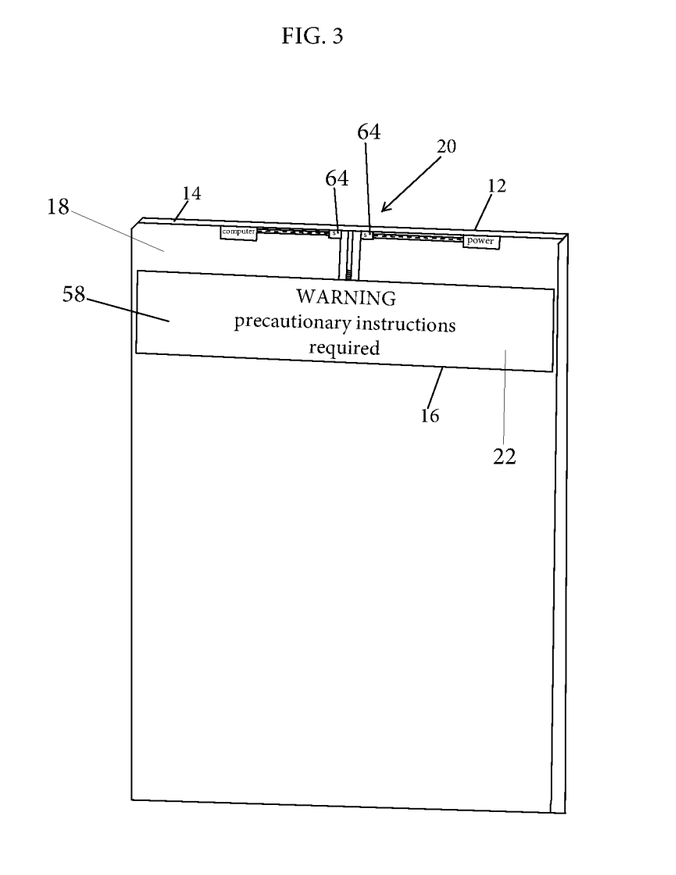
FIG. 3 shows the arrangement of the release screen.

The associated security procedures include the alert box 16 of the pre-delivery alert system 20 being configured to emit a plurality of lighting colors 56 once the level of security of the items 38 has been assigned by the online order system and the customer retrieves the items 38 from the conveyor belts 28. Similarly, the release screen 22 of the alert box 16 is configured to produce a plurality of security messages 58 once the security alert level of the items 38 has been assigned by the online order system and the customer retrieves the items 38 from the conveyor belts 28. Each of the security messages 58 would be displayed in the line of sight of the customer or employee. The size of the release screen 22 can be designed to be clearly visible to customers and the customer can readily gaze in the direction of the release screen 22 and receive notice about the items 38 purchased. In most instances, the security messages 58 on the release screen 22 will be pre-selected based on the preferences of each store 26.

The alert box 16 has coplanar sides 62 and is substantially rectangular in shape. The release screen 22 is released in an upward or downward direction relative to the conveyor belt 28 exit areas and is disposed parallel to the coplanar sides 62 of the alert box 16. The release screen 22 is further supported by parallel sensors 64 being in direct communication with the pre-delivery alert system 20 and would be displayed in a vertical direction. The release screen 22 may also be attached together by suitable attachments as it is released downward. In most instances, the release screen 22 is removable and the alert box 16 can be used without a screen or a new release screen 22 can be attached. The store 26 can also attach additional screens or alert boxes as desired.

Figure 6:
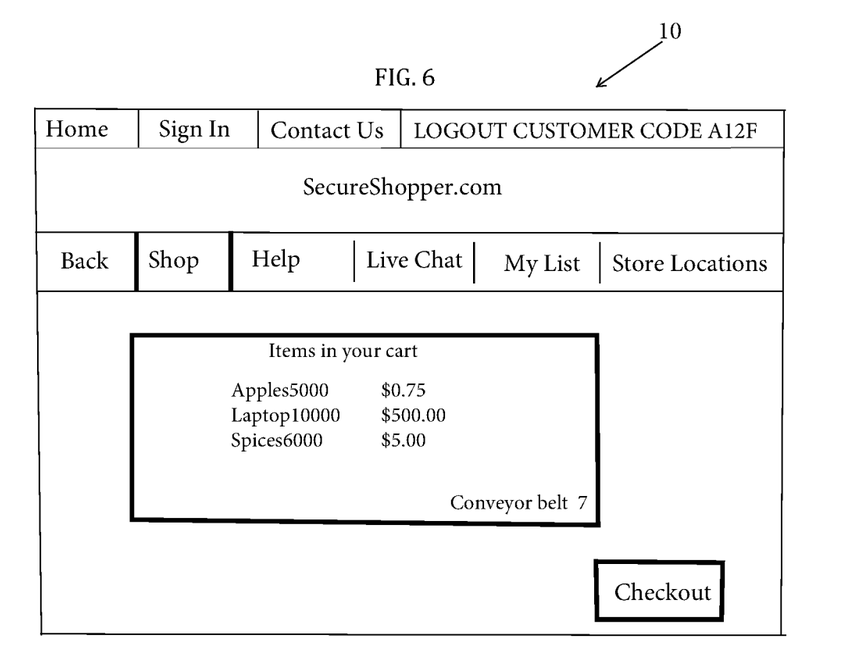
FIG. 6 shows a sample website being used to produce customer orders and assign conveyor belts.
Figure 7:
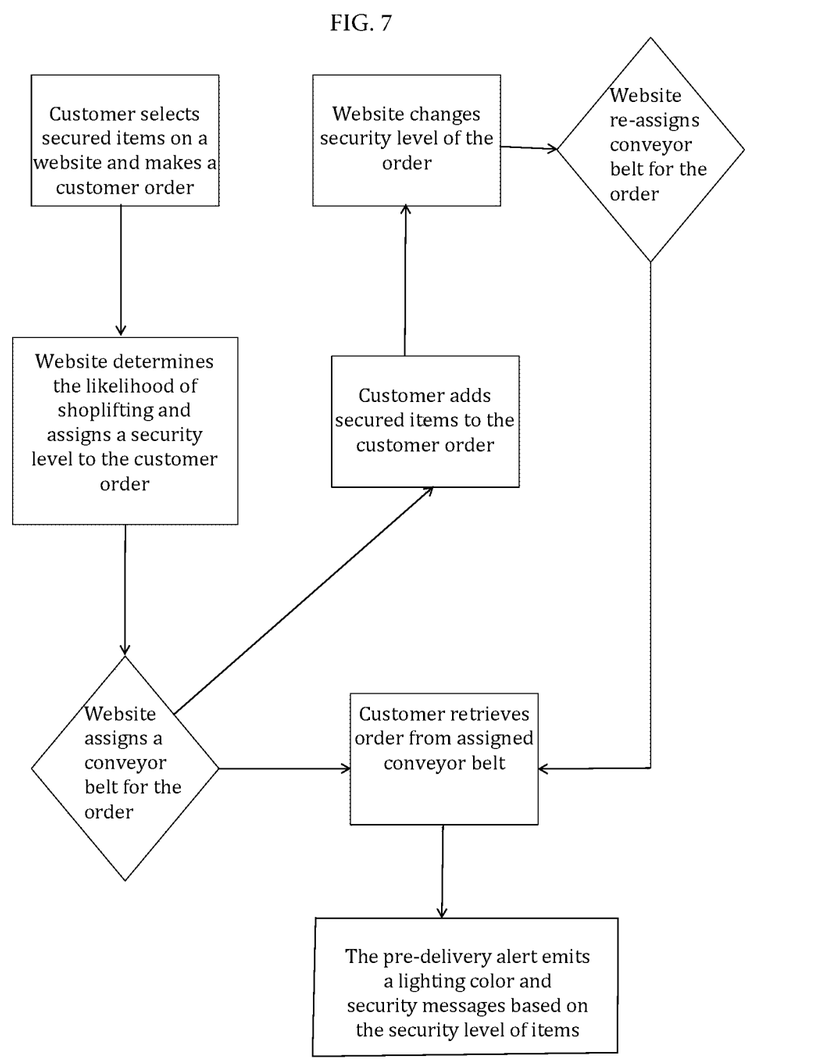
FIG. 7 is a flow chart showing the method of delivering items according to an exemplary embodiment of the present invention.
Figure 8:
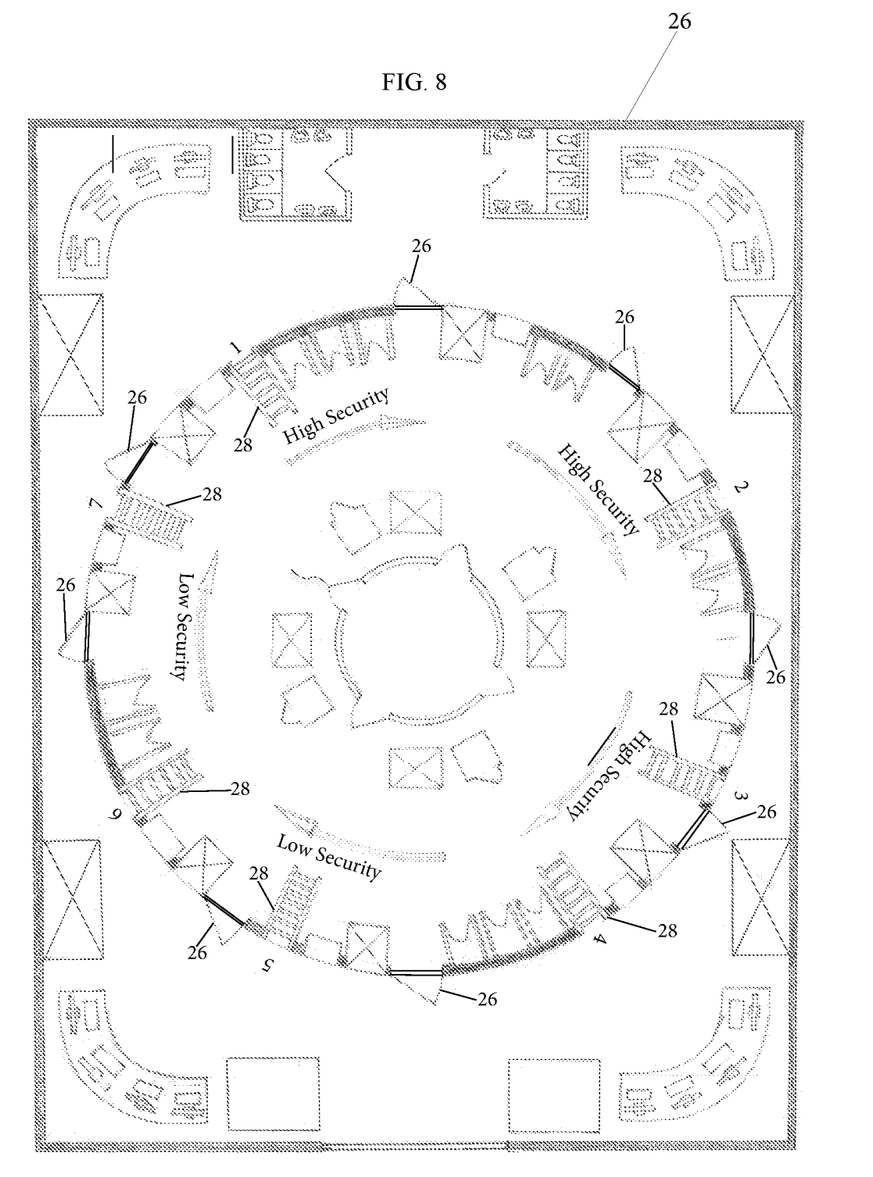
FIG. 8 is a plan of a store according to an exemplary embodiment of the present invention.

The online order system 10 can be a website where a customer selects the items 38 based on a previous order. In that case the online order system 10 would process the order quickly and the conveyor belt 28 would have been pre-selected. In a typical order and retrieval process, each of the conveyor belts 28 has a different level of security based on the items 38 in the customer order 52, the likelihood of shoplifting the items 38, and the security alert levels of the items 38. The online order system 10 is used to finalize each sale and directs the customer to a specific conveyor belt 28. Each of the conveyor belts 28 have pre-assigned assigned levels based on the levels of security used by the online order system 10.

What is claimed is:

1. A new method of delivering items using a release screen and a conveyor belt layout of a store, said method comprising the steps of:
   a. using a pre-delivery alert system and an online order system to receive data, read data, and perform computations from a data storage system, wherein said pre-delivery alert system has an alert box and an interior space,
   b. storing said release screen in said interior space of said pre-delivery alert system;
   c. storing by said online order system said conveyor belt layout of said store wherein said store has a plurality of conveyor belts and conveyor belt exit areas;
   d. receiving by said online order system the theft history and threat level of said items;
   e. identifying said items in a customer order and the threat level associated with said items;
   f. identifying the highest threat level from among said items in said customer order;

g. assigning a level of security corresponding to said highest threat level;
h. assigning a conveyor belt based on said level of security, wherein each of said plurality of conveyor belts has a different level of security and associated security procedures;
i. placing said customer order for at least one of said items in said online order system from a kiosk of said store and wherein and said online order system accepts said customer order and said online order system assigns said conveyor belt for retrieval of said items at said store,
j. displaying said items and said conveyor belt on a receipt and wherein said customer retrieves said items from said conveyor belt;
k. said alert box emitting colors indicative of said threat level as said customer retrieves said items from said conveyor belt;
l. said release screen displaying security messages alter said customer retrieves said items from said conveyor belt and wherein said pre-delivery alert system produces said colors and said security messages based on said security level of said items being delivered to said customer.

2. The method of claim 1 wherein said alert box has coplanar sides and is rectangular in shape.

3. The method of claim 1 wherein said release screen is positioned relative to said conveyor belt exit areas.

4. The method of claim 1 wherein said release screen of said alert box is disposed parallel to said coplanar sides of said alert box.

5. The method of claim 1 wherein said release screen of said alert box is in direct communication with said pre-delivery alert system.

6. The method of claim 1 wherein said security messages on said release screen are pre-selected by said store.

7. The method of claim 1 wherein said online order system is a website.

8. The method of claim 1 wherein said online order system is used to finalize a sale.

* * * * *